United States Patent
Xu et al.

(10) Patent No.: US 9,232,478 B2
(45) Date of Patent: Jan. 5, 2016

(54) FREQUENCY SCAN METHOD FOR DETERMINING THE SYSTEM CENTER FREQUENCY FOR LTE TDD

(71) Applicant: QUALCOMM Incorporated, San Diego, CA (US)

(72) Inventors: Huilin Xu, San Diego, CA (US); Raghu Narayan Challa, San Diego, CA (US); Hisham A. Mahmoud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 13/781,394

(22) Filed: Feb. 28, 2013

(65) Prior Publication Data

US 2013/0229955 A1    Sep. 5, 2013

Related U.S. Application Data

(60) Provisional application No. 61/606,340, filed on Mar. 2, 2012.

(51) Int. Cl.
*H04L 1/00* (2006.01)
*H04W 52/18* (2009.01)
*H04W 52/14* (2009.01)
(Continued)

(52) U.S. Cl.
CPC ............. *H04W 52/18* (2013.01); *H04B 17/101* (2015.01); *H04W 48/16* (2013.01); *H04W 52/143* (2013.01)

(58) Field of Classification Search
CPC .................................................... H04W 52/18

USPC .......................................................... 370/280
See application file for complete search history.

(56) References Cited

U.S. PATENT DOCUMENTS 6,186,951 B1 *   2/2001   Lizzi et al. .................... 600/458
8,145,132 B2     3/2012   Amerga et al.
(Continued)

FOREIGN PATENT DOCUMENTS

CN    100391285 C    5/2008
WO    2009039211     3/2009
(Continued)

OTHER PUBLICATIONS

International Search Report and Written Opinion—PCT/US2013/028674—ISA/EPO—May 15, 2013.
(Continued)

*Primary Examiner* — Shripal Khajuria
(74) *Attorney, Agent, or Firm* — Norton Rose Fulbright US LLP

(57) ABSTRACT

A method, an apparatus, and a computer program product for wireless communication are provided in which a set of time intervals is obtained from a received radio frequency signal. A power profile is determined for a frequency spectrum segment in each time interval. A first list is used to identify frequency spectrum segments that exhibit a power or energy profile over a range of frequencies associated with a downlink channel bandwidth, and a second list is used to identify frequency spectrum segments that have a total or average energy greater than a threshold energy relative to a noise floor. An absolute radio frequency channel number (ARFCN) of a wireless communication system is determined based on the time intervals identified in the first and second lists.

42 Claims, 13 Drawing Sheets

(51) Int. Cl.
*H04W 48/16* (2009.01)
*H04B 17/10* (2015.01)

(56) References Cited

U.S. PATENT DOCUMENTS

| | | | |
|---|---|---|---|
| 2006/0189288 A1* | 8/2006 | Jin et al. | 455/232.1 |
| 2007/0168409 A1* | 7/2007 | Cheung | 708/400 |
| 2008/0013480 A1* | 1/2008 | Kapoor et al. | 370/328 |
| 2008/0273518 A1* | 11/2008 | Pratt et al. | 370/345 |
| 2008/0273641 A1* | 11/2008 | Yang et al. | 375/359 |
| 2009/0137267 A1 | 5/2009 | Nader et al. | |
| 2011/0211503 A1 | 9/2011 | Che et al. | |

FOREIGN PATENT DOCUMENTS

| | | |
|---|---|---|
| WO | 2010031725 A1 | 3/2010 |
| WO | 2011147160 A1 | 12/2011 |

OTHER PUBLICATIONS

Taiwan Search Report—TW102107300—TIPO—Apr. 14, 2015.

* cited by examiner

FREQUENCY SCAN METHOD FOR DETERMINING THE SYSTEM CENTER FREQUENCY FOR LTE TDD

CROSS-REFERENCE TO RELATED APPLICATIONS

This application claims the benefit of U.S. Provisional Patent Application No. 61/606,340, entitled, "FREQUENCY SCAN METHOD FOR DETERMINING THE SYSTEM CENTER FREQUENCY FOR LTE TDD", filed on Mar. 2, 2012, which is expressly incorporated by reference herein in its entirety.

BACKGROUND

1. Field

The present disclosure relates generally to communication systems, and more particularly, to a method for acquiring a radio frequency channel number.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method of wireless communication comprises determining power profiles of frequency spectrum segments of a received radio frequency signal in a plurality of time intervals. A power profile of a frequency spectrum segment may be characterized by energy of the frequency spectrum segment and a distribution of the energy over the frequencies in the frequency spectrum segment.

In an aspect of the disclosure, a first list of frequency spectrum segments is generated for each time interval, the first list identifying frequency spectrum segments in the each time interval that have an energy distribution matching a power profile of a downlink signal. A second list of frequency spectrum segments for each time interval may be generated, the second list identifying frequency spectrum segments in the each time interval that have an average energy or a total energy greater than a threshold energy relative to a noise floor.

In an aspect of the disclosure, a downlink frequency of a wireless communication system is determined based on the frequency spectrum segments identified in the first and second lists. The downlink frequency by merging the first lists generated for the plurality of time intervals into a merged first list that is ordered by number of occurrences of spectrum segments, and merging the second lists generated for the plurality of time intervals into a merged second list that is ordered by number of occurrences of spectrum segments. The merged first list and the merged second list are further ordered by total or average spectrum segment energy.

In an aspect of the disclosure, determining the downlink may include combining the merged first list, with the merged second list to obtain a combined list limited to a predefined number of the most frequently occurring spectrum segments, and searching the spectrum segments identified in the combined list for the available uplink frequency and the available downlink frequency. The predetermined number is selected to obtain a desired maximum absolute radio frequency channel number acquisition time. The spectrum segments may be added to the combined list from the merged first list and the merged second list based on their frequency of occurrence and a list priority, the merged first list having a higher priority than the priority of the merged second list.

In an aspect of the disclosure, determining the downlink frequency includes identifying an absolute radio frequency channel number corresponding to the determined downlink frequency.

In an aspect of the disclosure, the received radio frequency signal includes a downlink signal transmitted by an access point and an uplink signal transmitted by user equipment, and wherein the number of time intervals is selected to provide at least one time interval comprising the downlink signal, without the uplink signal.

In an aspect of the disclosure, the duration of each time interval corresponds to a downlink slot transmission time of the wireless communication system. The plurality of time intervals may comprise consecutive time intervals, and the plurality of time intervals may span half a frame transmission time of the wireless communication system. The plurality of time intervals may comprise 10 time intervals and each of the plurality of time intervals may have a duration of 0.5 milliseconds, totaling at least 5 milliseconds duration. In some embodiments, the plurality of time intervals repeats every 10 milliseconds.

In an aspect of the disclosure, a spectrum estimate of the received radio frequency signal in each of the plurality of time intervals is averaged with a spectrum estimate of the received radio frequency signal in a corresponding time interval in another plurality of time intervals. The spectrum estimates from corresponding time intervals may be averaged using a pipeline.

In an aspect of the disclosure, the frequency spectrum segments identified in the first lists are bounded by guard bands. The noise threshold may be determined based on the energy of one or more guard band frequencies added to a preconfigured offset value. In some embodiments, the noise floor is determined based on the energy of one or more guard band frequencies and the threshold energy is determined by offsetting the noise floor by a preconfigured offset value.

In an aspect of the disclosure, determining the downlink frequency includes determining a time division duplex uplink-downlink pattern. Determining the power profiles of the frequency spectrum segments may include selecting a time division duplex band index number. Determining the power profiles of the frequency spectrum segments includes setting a gain state for a low noise amplifier.

DETAILED DESCRIPTION

Figure 1:
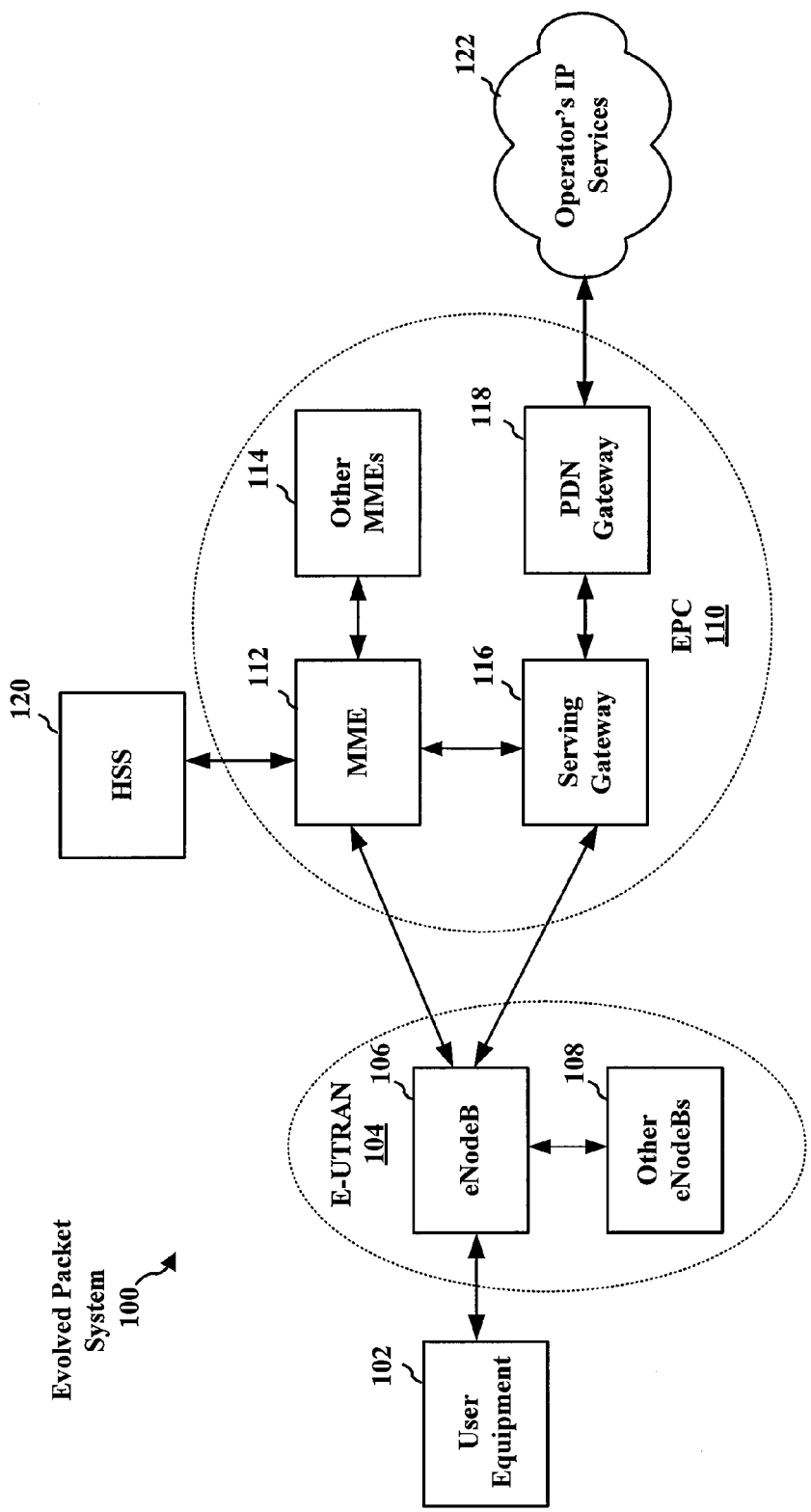
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
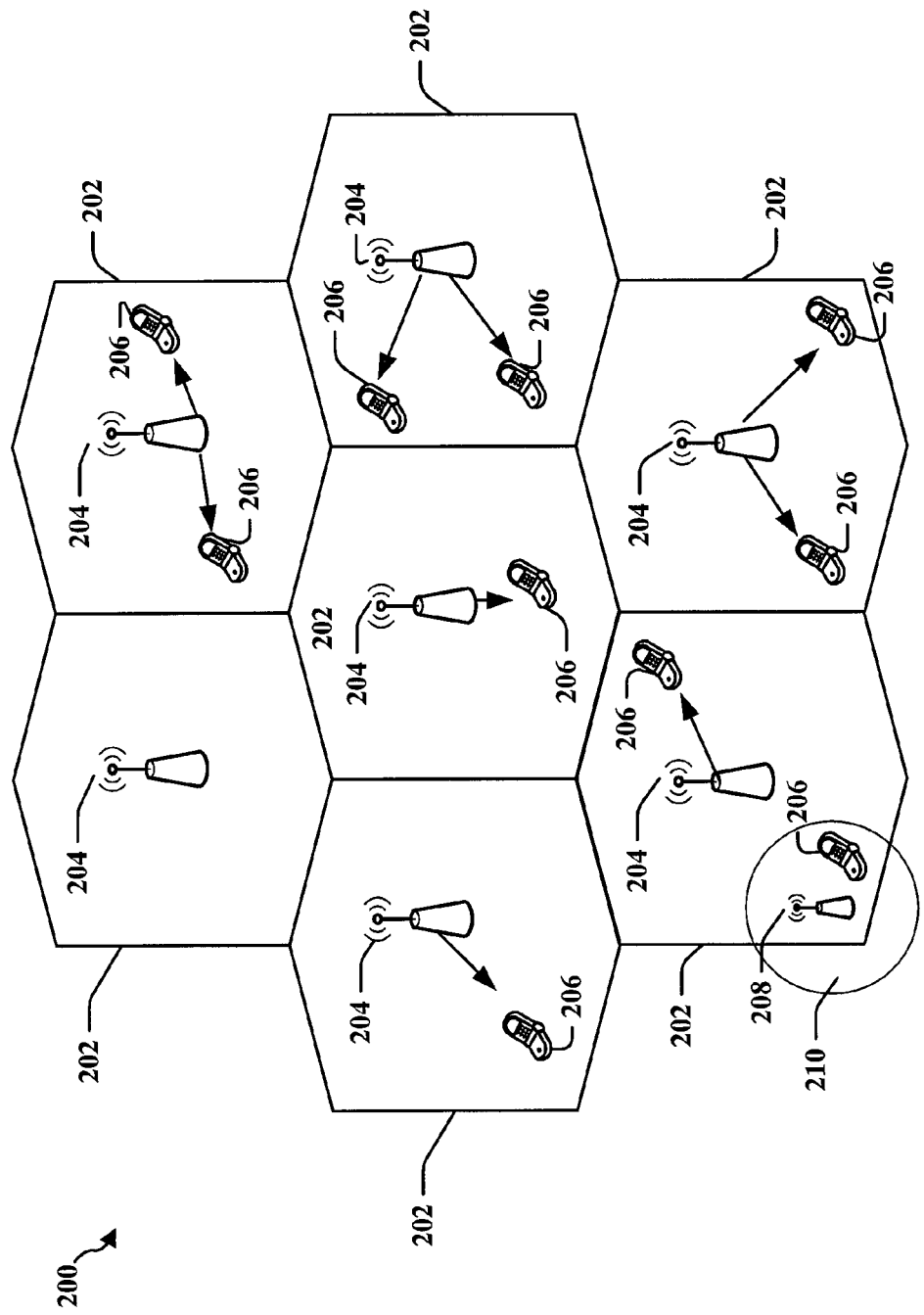
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
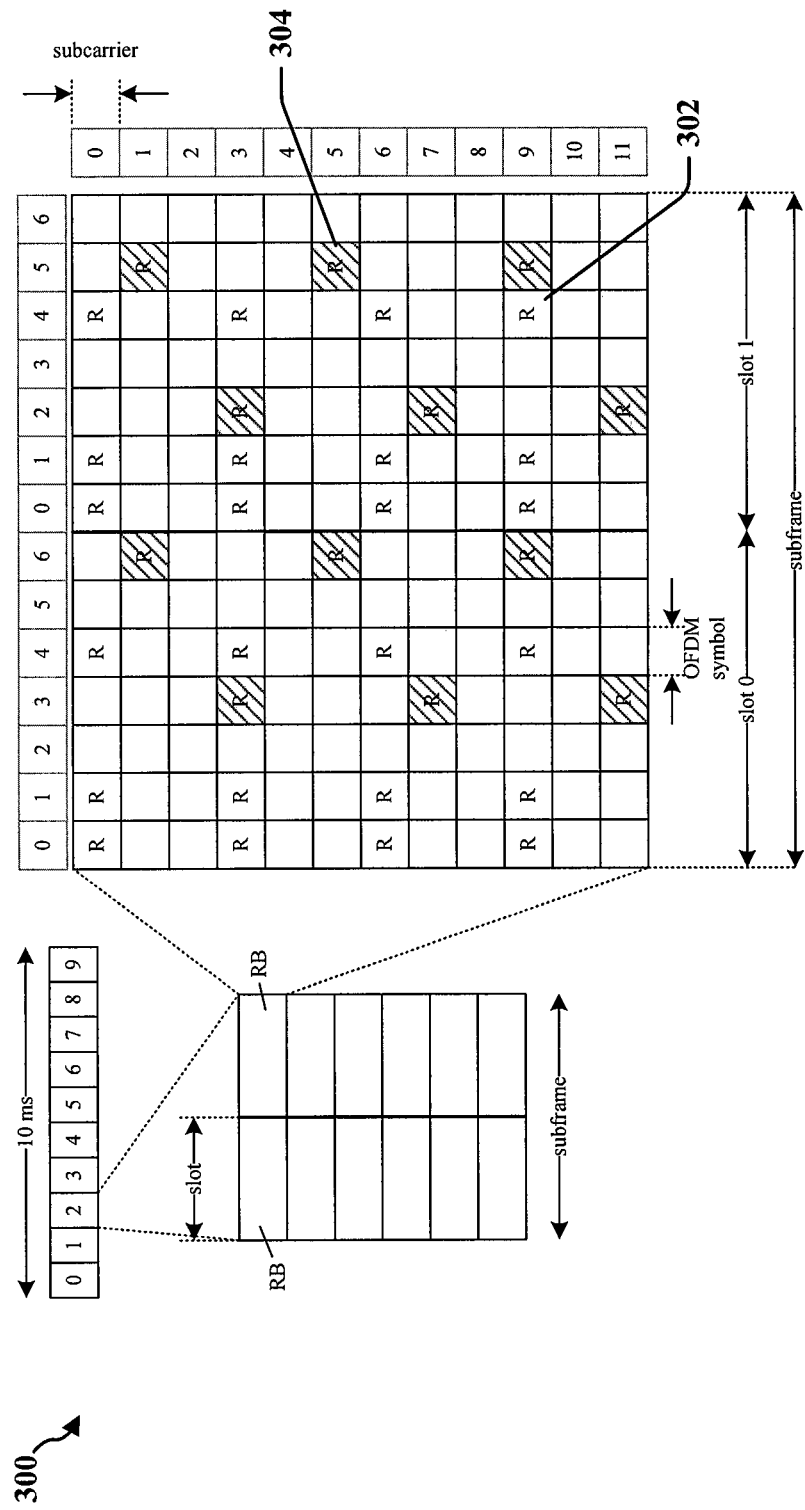
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
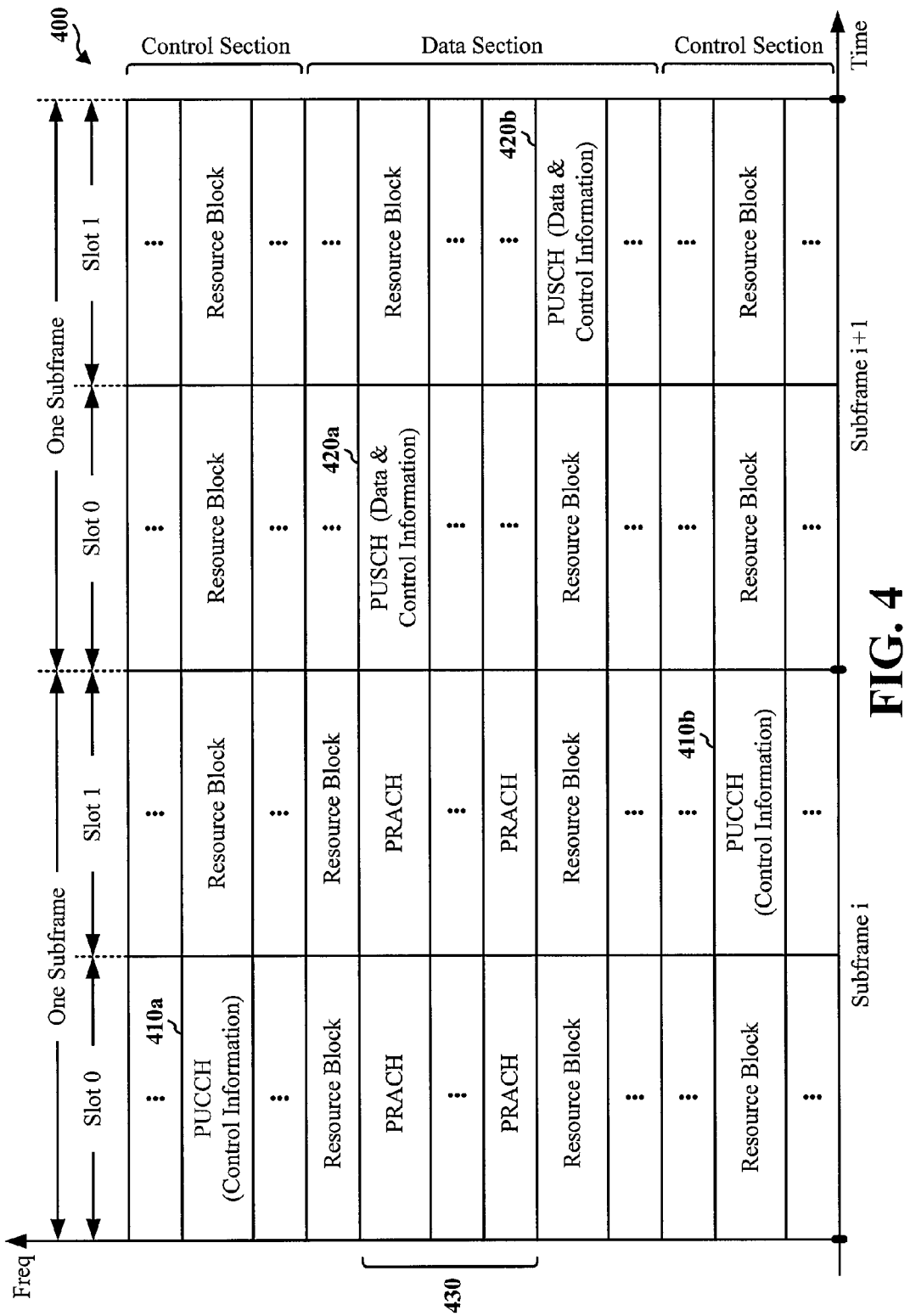
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
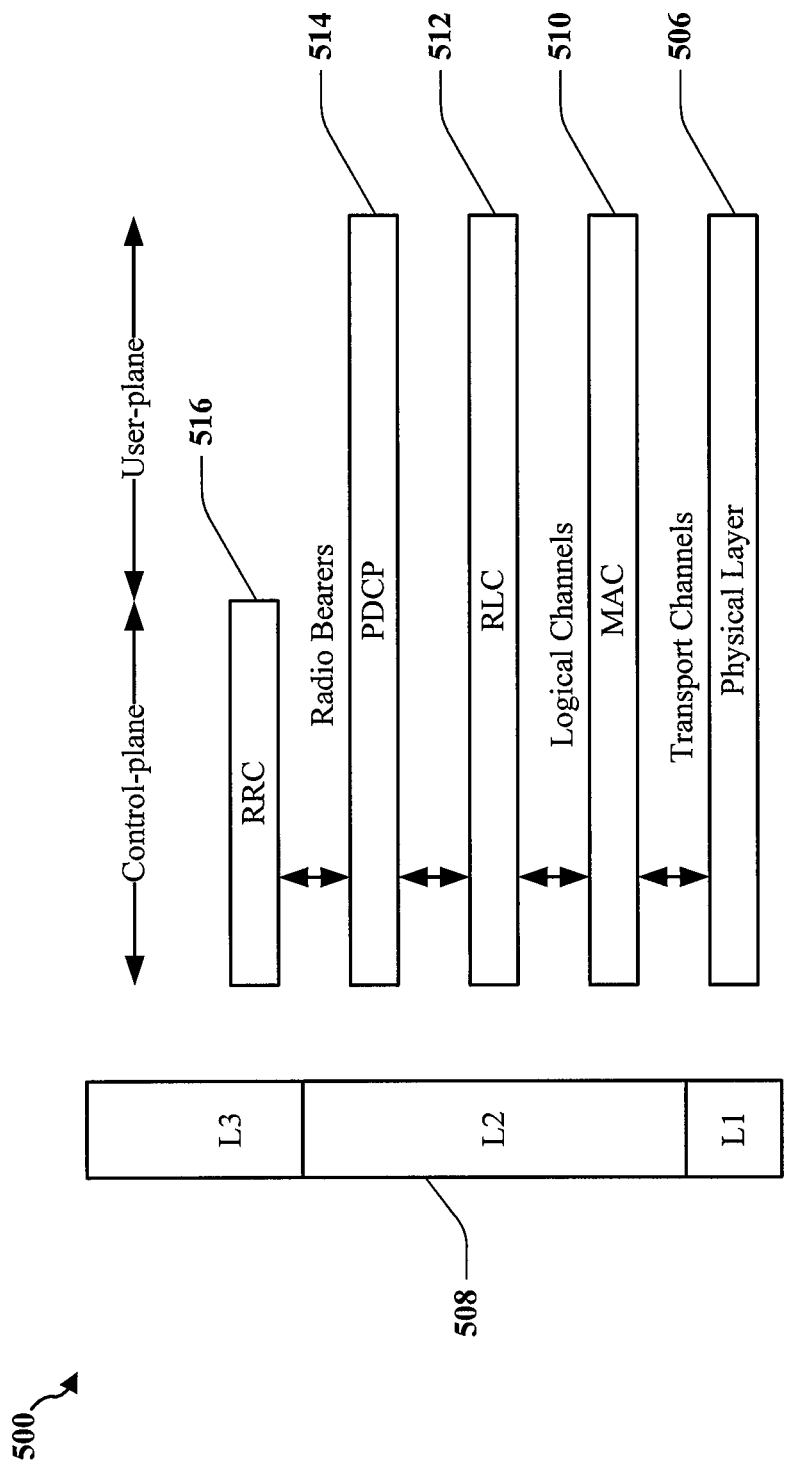
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
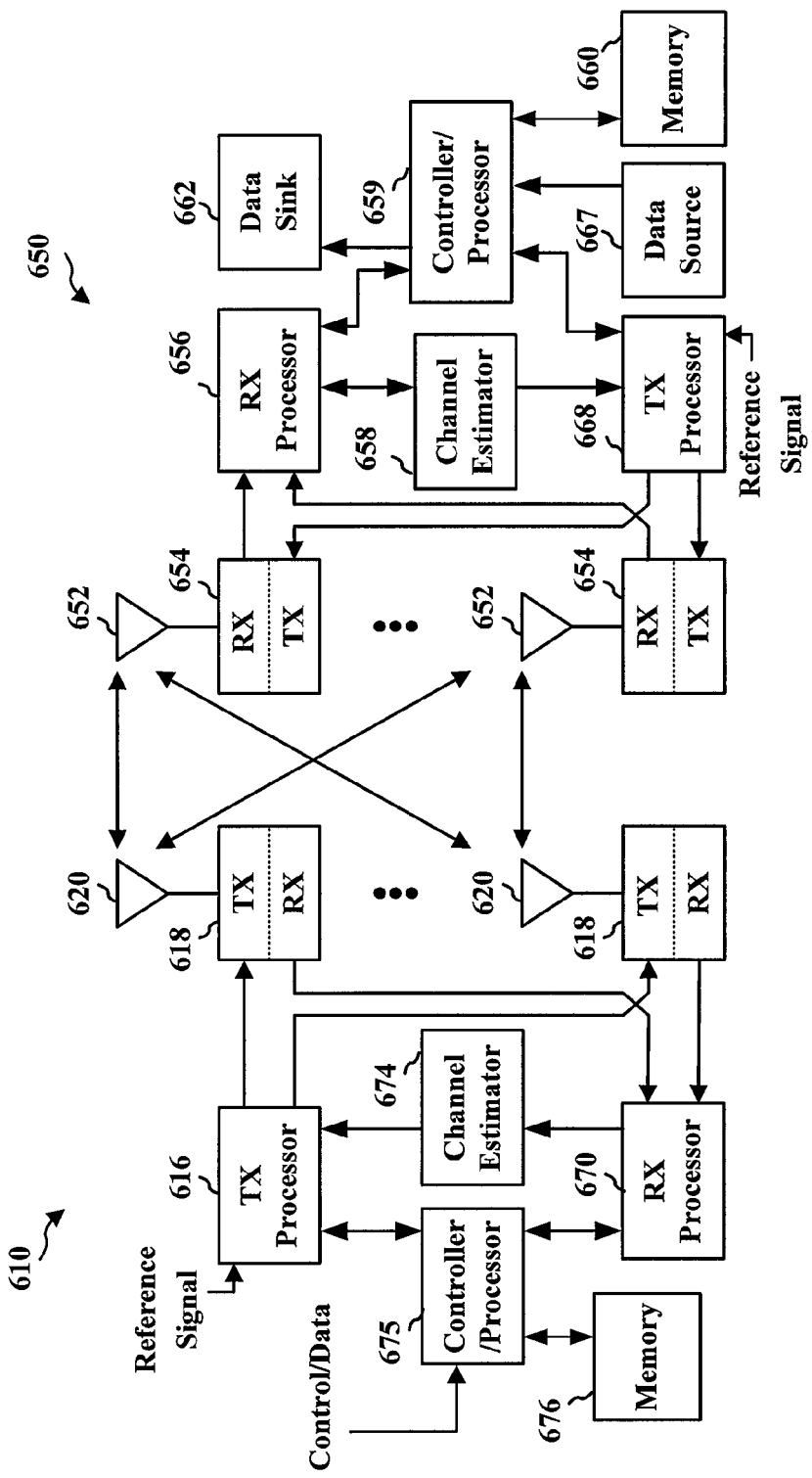
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
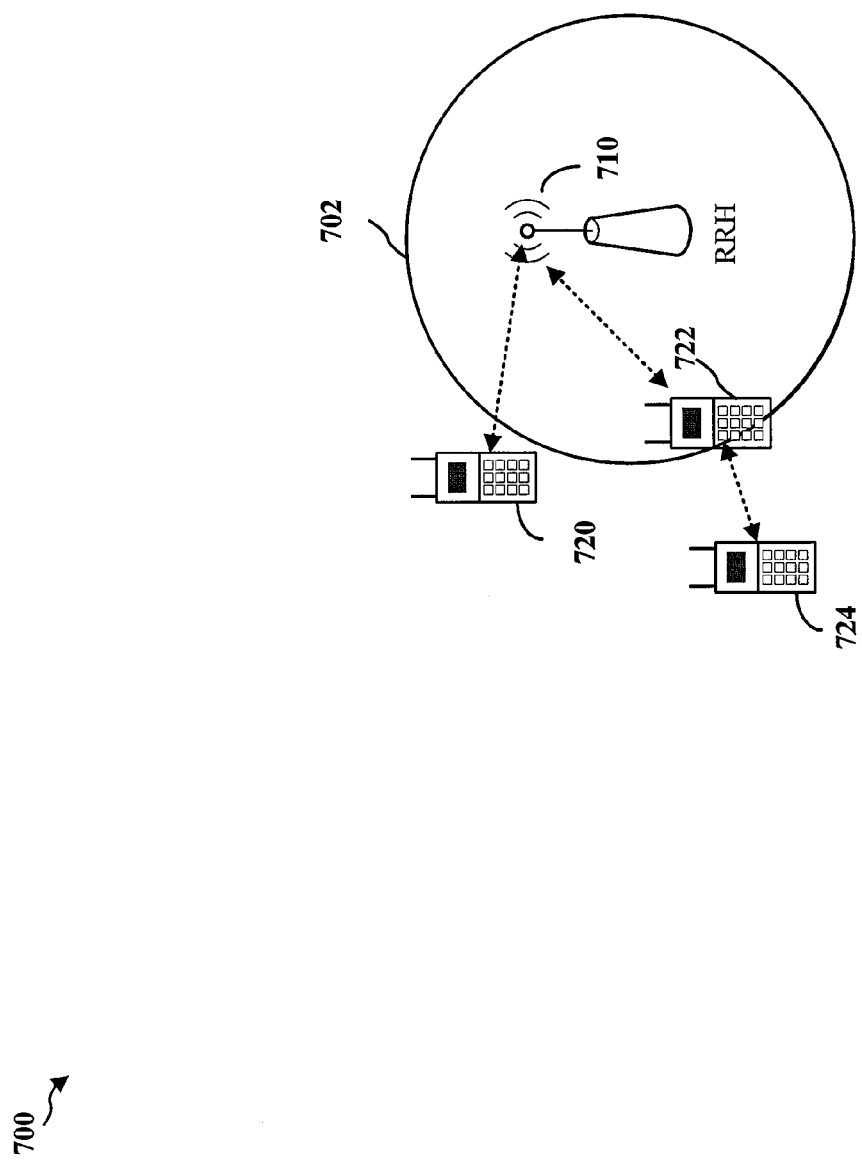
FIG. 7 is a diagram illustrating a cellular region in a heterogeneous network.

FIG. 7 is a diagram 700 illustrating a cellular region in a heterogeneous network comprising an eNB 710 and multiple UEs 720, 722 and 724. Aspects of the present invention relate to the acquisition of timing and frequency during cell search by UE 722 which is attempting to find an E-UTRA channel that can be used between eNB 710 and a UE 722. Frequencies associated with an E-UTRA channel may identify an E-UTRA absolute radio frequency channel number (EARFCN). Each E-UTRA channel may have different combinations of bandwidths that may be used by UE 722 and may support FDD or TDD. FDD spectrum requires an uplink band and a downlink band for simultaneous transmission, while TDD requires a single band in which uplink and downlink are transmitted on the same frequency but at different times. In some instances LTE band allocations for TDD and FDD may overlap, and it is possible that uplink and downlink signals may appear in the same band.

Figure 8:
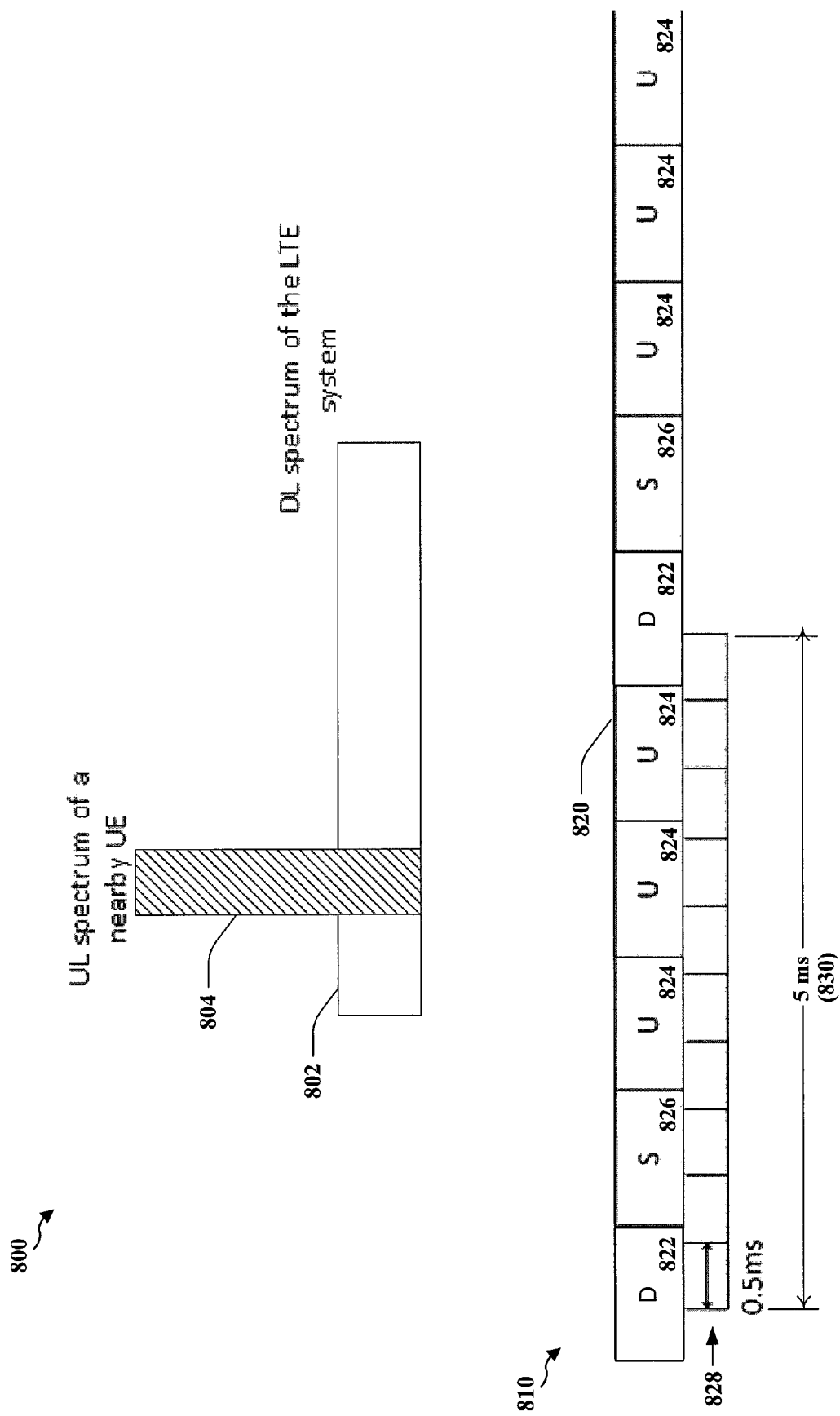
FIG. 8 is a diagram illustrating interfering downlink and uplink signals.

With reference also to FIG. 8, UE 722 may seek a downlink signal 808 during cell search, by examining spectrum segments that have characteristics corresponding to an E-UTRA band of frequencies used for downlink signaling. In one example, TDD band #38 may be split into 6 carriers with a 9 MHz bandwidth for each carrier. Some embodiments of the invention may scan all of the 6 carriers to cover the entire band.

A spectrum segment may be characteristic of an LTE downlink signal if it satisfies certain requirements. A downlink signal in an LTE system may have a profile characterized by, for example, a flat or other spectral profile over the bandwidth and a sharp drop at the edges of the spectrum due to guard bands. LTE defines channels having bandwidths of 1.4 MHz, 3 MHz, 5 MHz, 10 MHz, 15 MHz or 20 MHz. The spectral profile may be flat or have another shape and be bounded by guard bands. The UE 722 may determine that a received signal comprises an LTE downlink signal if the power profile of the spectrum matches a profile associated with an LTE downlink signal (e.g. flat enough across a channel bandwidth), with a sharp drop off in power at the edges of the channel corresponding to guard bands. FIG. 8 illustrates a downlink spectrum 802 in an LTE system.

Figure 9:
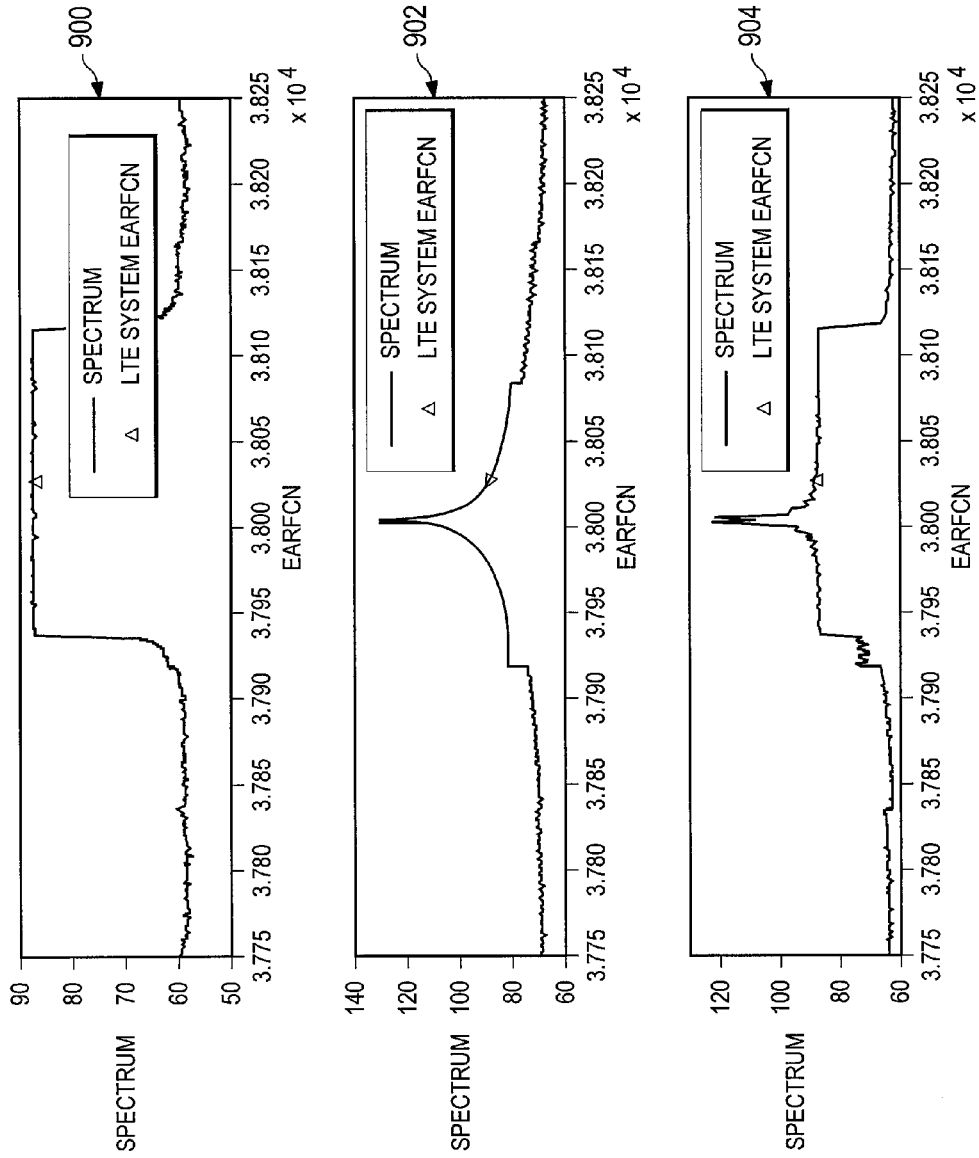
FIG. 9 illustrates spectra in uplink and downlink signals.

UE 722 may be configured to find and synchronize with the center frequency of the channel. UE may identify the center frequency based on the energy and power profile of a detected spectrum in a received RF signal. The presence of an uplink signal 804 transmitted by a nearby and/or high-power UE 724 may prevent UE 722 from identifying the correct center frequency and may prevent the UE 722 from obtaining an EARFCN for an available channel. Uplink transmissions 808 by UE 724 typically have a narrower bandwidth than downlink transmissions 808 but can have significantly higher power. Moreover, in TDD mode, uplink transmissions 808 from UE 724 may overlap the downlink transmission 808 of eNB 710. Accordingly, UE 722 may identify a downlink channel that matches a downlink spectrum profile but may misidentify the center frequency of the channel based on power distribution within the spectrum. FIG. 9 provides examples of a spectrum 900 for a pure uplink signal, a spectrum 902 for a pure downlink signal and a spectrum 904 observed when uplink and downlink signals overlap.

UE 722 may detect a downlink signal by characterizing a spectrum of an RF signal during a period of time corresponding to a downlink frame transmit period or a portion of the frame transmit period or other interval. In LTE systems, for example, the frame transmit time may be 10 milliseconds and the period of time may be 5 milliseconds. UE 722 may identify, in a first list, an EARCFN candidate corresponding to a spectrum that has a power profile associated with a downlink signal, typically with sharp drop off at the channel edges characteristic of low power guard bands. The EARFCN candidates may be identified by a center frequency of a spectrum segment. It can be expected that the first list may be relatively short when one or more uplink signals are present during transmission of the downlink signal.

UE 722 may compile a second list of EARFCN candidates when a spectrum corresponding to the EARCFN has a combined energy or an average energy that exceeds a threshold. Average energy may be expressed as energy per Hz, for example. In some embodiments, the second list may comprise candidates that relate to spectra that did not qualify for inclusion in the first list. The energy threshold may be defined with respect to a noise floor and the threshold may be used to eliminate or qualify EARFCN candidates. The noise floor may be calculated from the energy levels of certain frequencies, such as frequencies in the guard band. The energy in the lowest energy frequencies may be used to calculate a noise floor and the threshold value may be set using a correction factor or other configured offset to accommodate specific characteristics of the wireless system. In one example, a threshold may be set using a configured offset of 2-3 dB selected to enable elimination of a certain percentage of spectrum segments from consideration.

The second list may allow the UE 722 to find a system EARFCN even in the presence of uplink signals received from nearby UEs 724. Some candidates listed in the second list may correspond to a spectrum having a total energy or average energy that exceeds the energy threshold but that has frequencies of a high-power uplink signal without the range of frequencies expected in a downlink signal. Accordingly, EARFCN candidates found in the first list are more likely to yield usable EARFCNs and the UE 722 may locate a center frequency for the downlink channel with a greater degree of confidence because the first list typically does not include a spectrum that include frequencies contributed by uplink signals.

The lists compiled by UE 722 may provide a number of EARFCN candidates that UE 722 may search in an attempt to acquire timing and frequency information and to ultimately determine a usable EARFCN. The number of searches to be performed may result in a long acquisition time. For example, TDD band #38 may comprise a 50 MHz band and the combined lists may provide approximately 500 or more searches. Since acquisition of timing and frequency may take 50 ms, the UE 722 may spend 25 seconds or more searching an empty band 38.

Cell acquisition times may be improved by separating downlink and uplink signals. In some embodiments, spectrum segments in time intervals corresponding to a slot transmission time may be analyzed to ensure that at least one spectrum segment comprises a downlink signal with no uplink signal. In one example, 10 spectrum estimates in time interval of 0.5 ms correspond to LTE slot transmission timing. A DL frame structure 300 (see FIG. 3) in an LTE system may have a duration of 10 ms and may be divided into 10 equally sized sub-frames, each having two slots of 0.5 ms.

For LTE systems having a frame transmission time of 10 ms, the 10 spectrum estimates may span a 5 ms period during the EARFCN acquisition process. In certain embodiments of the invention, spectrum estimates are obtained during each of a set of 10 or more time intervals spanning a 5 ms total period in order to capture at least one spectrum segment comprising a downlink signal, while excluding the spectrum of an interfering uplink signal in other slots. The timing chart 810 depicts TDD timing 820 in which downlink transmission 822, uplink transmission 824 and other transmissions 826 occur at different times. Spectrum segments in a plurality of time intervals 828 may be analyzed within the 5 ms window 830 and the characteristics of the spectrum found in each 0.5 ms time interval of the set of time intervals is analyzed to determine if a downlink signal is present. In some embodiments, spectrum estimates in corresponding time intervals 828 of two or more sets 830 of time intervals 828 may be averaged to obtain a smoother and more consistent spectrum estimate. In one example, pipeline based averaging may be used to combat loading and fading variations observed in the RF signal and/or in specific spectrum segments. Pipeline averaging may require additional memory to maintain intermediate values used in averaging between consecutive sets of time periods.

The examination of spectrum segments in shorter time intervals 828 may require a significant increase in processing time and, consequently, increased acquisition time. In some embodiments, acquisition time can be reduced by parallel processing and/or by limiting the number of EARFCN candidates to be searched.

For each time interval 828 in the set of time intervals 830, UE 722 may identify in a first list, any EARFCN candidate corresponding to a discovered spectrum segment that has a certain power profile over a range of frequencies corresponding to an LTE channel bandwidth and that has guard bands at the upper and lower edges of the spectrum segment, which may appear as a sharp drop off at the spectrum edges. In a second list, the UE 722 may identify occurrences of a spectrum that have a combined energy that exceeds a threshold defined with respect to a noise floor.

The shortened time intervals 828 may generate a large number of candidate EARFCNs, which relate to a frequency or range of frequencies corresponding to a spectrum segment found in a time interval 828. The UE 722 may select a limited number of EARFCN candidates for cell searching and may consolidate the first lists for one or more sets of time intervals 828 and the second lists for one or more sets of time intervals 828. The UE 722 may also prioritize the contents of the lists, prioritize the first lists above the second lists set and/or concatenate the first and second list to obtain a number of channels to be searched. In some embodiments, results may be prioritized based on a frequency of occurrence of a frequency or band of frequencies in one or more lists. Different frequencies that have the same number of occurrences may be sorted according to energy levels of the corresponding spectrum segments.

In one example, the UE 722 may combine or merge all of the first lists generated from the sets of 10 time intervals and may combine or merge all of the second lists generated from the sets of time intervals. The UE may then sort each of the combined first and second lists by order of frequency of occurrence of identified frequencies. The UE may sort the combined first list based on energy of the frequencies identified in the first list. The UE may then add entries from the combined second list to the combined first list to obtain a third list for searching.

In certain embodiments, the UE may compile a third list or group of spectrum segments to be searched, where the membership of the group does not exceed a predefined number of entries, which may be 50 entries for example. Typically, entries in the first lists may be associated with a greater level of confidence and the first lists may consequently be assigned a higher priority for the purposes of selection to the third list. In some embodiments, spectrum segments identified in both the first and second lists may be prioritized based on frequency of occurrence in both lists. In some embodiments, spectrum segments identified in both the first and second lists may be prioritized based on frequency of occurrence in the first list and the power levels detected in the time intervals 828 identified in the second list.

In certain embodiments, analysis of spectrum segments may yield additional information related to the wireless system. For example, an analysis of frequency and timing of the spectrum segments observed in time intervals 828 may be used to determine a time division duplex uplink-downlink pattern.

Figure 10:
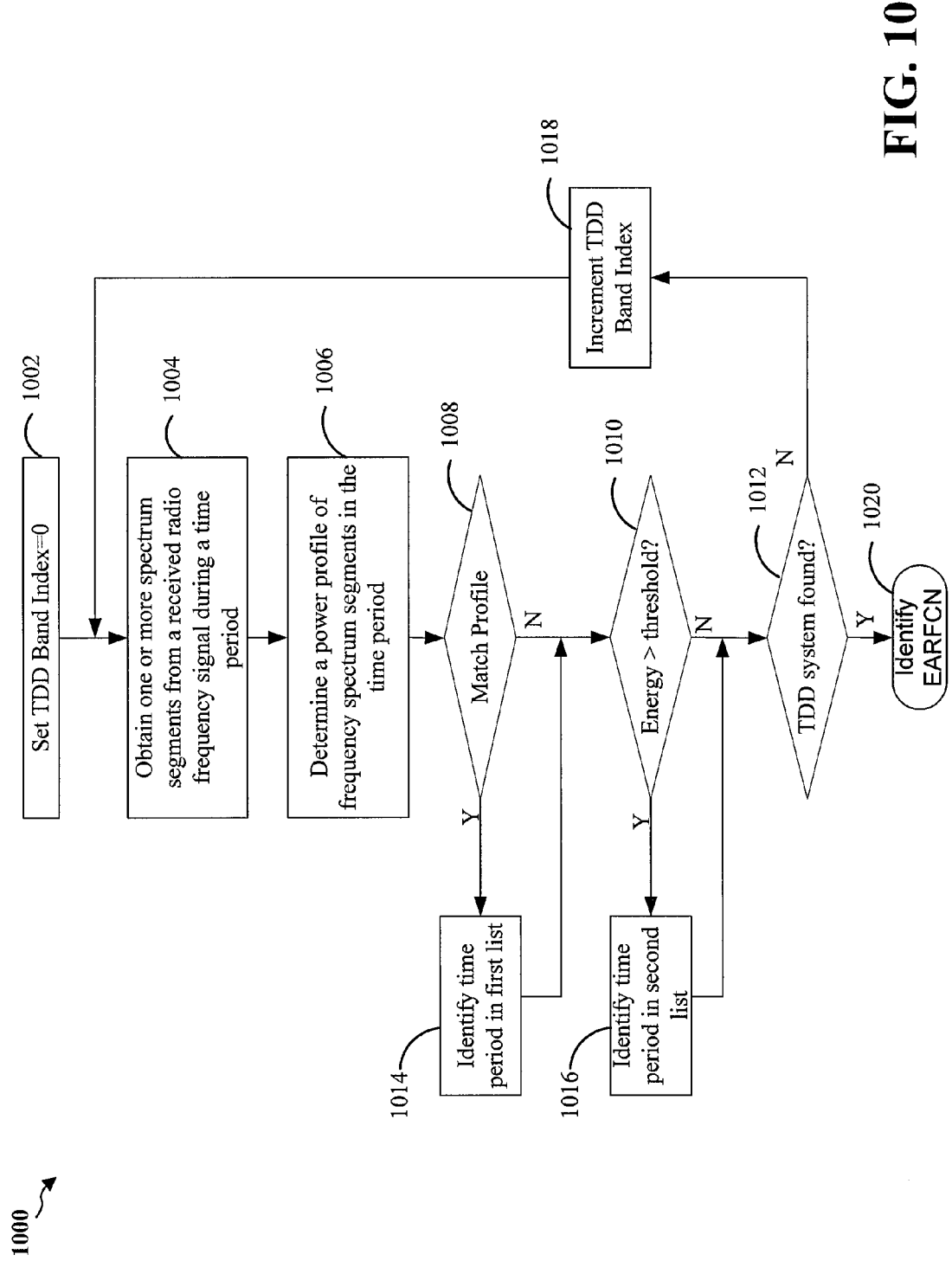
FIG. 10 is a flow chart of a method of wireless communication.

FIG. 10 is a flow chart 1000 of a method of wireless communication. The method may be performed by a UE 710 in order to identify an EARFCN in a TDD band. At step 1002, the UE 710 selects a first TDD band as a current TDD band. The current TDD band may be identified using a time division duplex band index number. Additionally, UE 107 may set a gain state for a low noise amplifier based on one or more factors, such as energy observed in the spectrum segments. At step 1004, the UE 710 may obtain a spectrum estimate representative of frequencies present in the current band. At step 1006, the UE 107 determines a power profile of a frequency spectrum segment in the time interval. The frequency spectrum segment may correspond to a channel of the current TDD band. The power profile may be characterized by energy of the frequency spectrum segment and a distribution of the energy over the frequencies in the frequency spectrum segment (see FIG. 8). If at step 1008, the UE 107 determines that the spectrum segment has a power profile consistent with the power profile of a downlink signal, then the spectrum segment and/or time interval may be identified in a first list of candidates at step 1014. In one example, a generally flat power segment 802 may extend across a channel bandwidth, as shown in the spectrum 900 of FIG. 9. If at step 1010, the UE 107 determines that the power profile of the spectrum segment exceeds a threshold energy, then the spectrum segment and/or time interval may be identified in a second list of candidates at step 1016. The spectrum segment may have an energy that exceeds a threshold when a proximately located high power UE transmits an uplink signal 804 in the spectrum segment, as shown in the example spectrum 902 and 904 of FIG. 9.

At step 1012, the UE 107 may determine an EARFCN of the wireless communication system (at step 1020) based on the time intervals and/or spectrum segments identified in the first and second lists. If no EARFCN can be determined, then the UE 107 may search another TDD band, incrementing the current band index at step 1018 and resuming the search at step 1004.

In the process illustrated in FIG. 10, the spectrum segment may relate to a period of time corresponding to a portion of a frame duration of an LTE system, which may be 10 ms or more. For example, the spectrum segment may relate to a period used of 5 ms. The process illustrated in FIG. 10 can be adapted and employed in certain embodiments of the invention which use a greater number of shorter timing intervals. Some embodiments of the invention perform the process using a set of time intervals that total 5 ms, and thus yield a multiple of the number of spectrum segments discussed in relation to FIG. 10.

Figure 11:
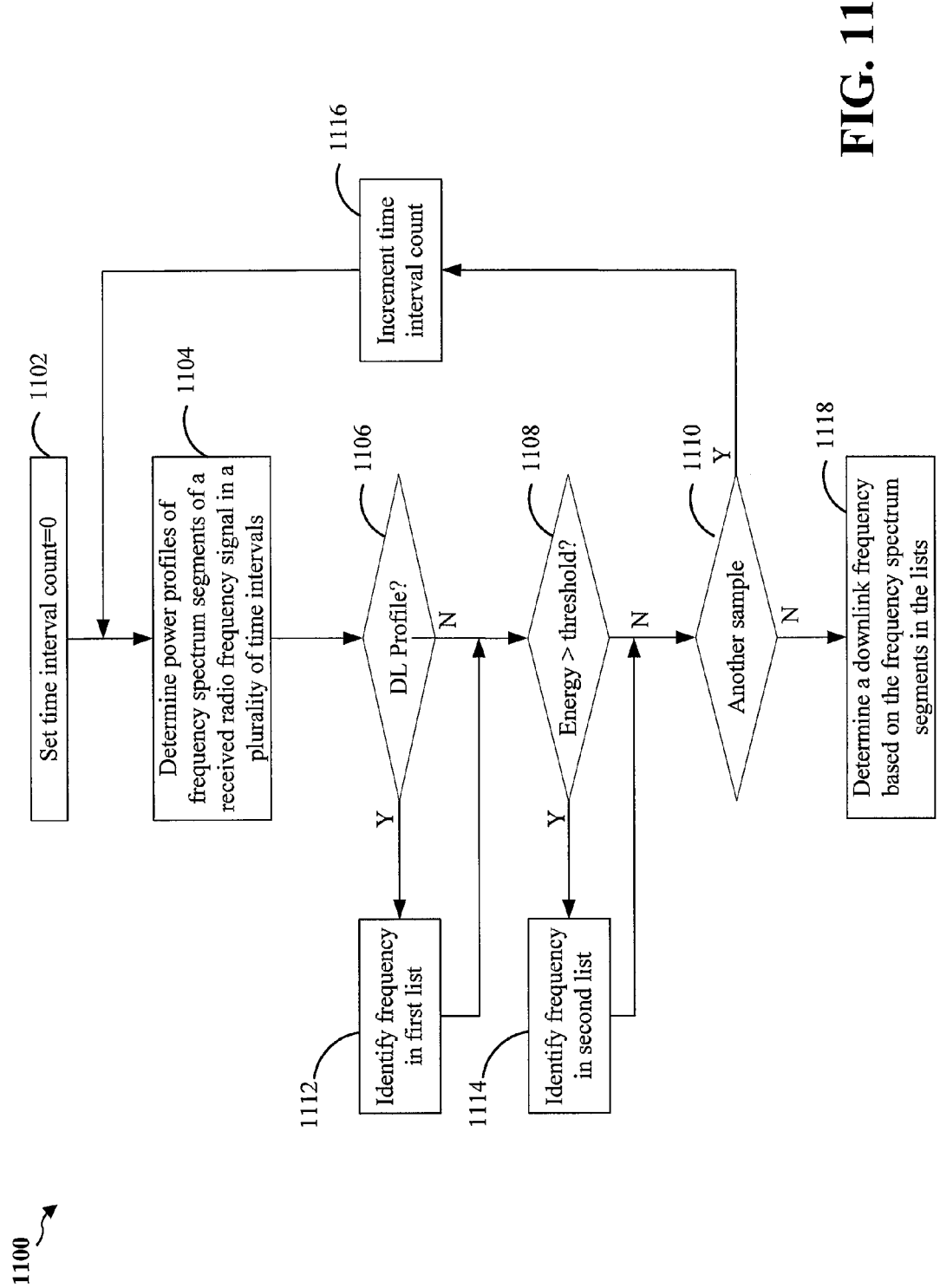
FIG. 11 is a flow chart of a method of wireless communication.

FIG. 11 is a flow chart 1100 of a method of wireless communication. The method may be performed by a UE 107. At step 1102, the UE 107 may create an index to the set of time intervals 828. The index may be used to identify a current time interval 828 in which a spectrum segment is analyzed. In some embodiments an index may not be used, including when spectrum segments are processed in parallel.

At step 1104, the UE 107 may determine power profiles of frequency spectrum segments of a received radio frequency signal in a plurality of time intervals 828. The duration of each time interval 828 may correspond to a downlink slot transmission time of a wireless communication system and the plurality of time intervals may comprise consecutive time intervals 828 and span half a frame transmission time of the wireless communication system. The plurality of time intervals may comprise 10 time intervals and each of the plurality of time intervals may have a duration of 0.5 milliseconds, totaling at least 5 milliseconds duration. In some embodiments, the plurality of time intervals repeats every 10 milliseconds.

A spectrum estimate of the received radio frequency signal in each of the plurality of time intervals 828 may be averaged with a spectrum estimate of the received radio frequency signal in a corresponding time interval in another plurality of time intervals. The spectrum estimates from corresponding time intervals may be averaged using a pipeline.

In some embodiments, the UE 107 may select a time division duplex band index number prior to determining the power profiles of the frequency spectrum segments. In some embodiments, the UE 107 may set a gain state for a low noise amplifier while determining the power profiles of the frequency spectrum segments.

The power profile of a frequency spectrum segment may be characterized by energy of the frequency spectrum segment and a distribution of the energy over the frequencies in the frequency spectrum segment (see, e.g. spectrum 900 of FIG. 9). The received radio frequency signal may include a downlink signal 802 transmitted by an access point (e.g. eNB 710) and an uplink signal 804 transmitted by user equipment 724. The number of time intervals 828 may be selected to provide at least one frequency spectrum segment comprising frequencies corresponding to the downlink signal 822, without frequencies from the uplink signal 824.

If at step 1106, the UE 107 determines that a spectrum segment in the current time interval 828 has an energy distribution matching a power profile of a downlink signal, then the spectrum segment may be identified in a first list of frequency spectrum segments for the current time interval 828 at step 1112. In one example, a downlink signal may have a profile that be characterized as a generally flat power segment 802 that may extend across a channel bandwidth, as shown in the spectrum 900 of FIG. 9. The frequency spectrum segments identified in the first lists may be bounded by guard bands. The wireless system may define a plurality of downlink channel bandwidths including one or more of 1.4 MHz, 3 MHz, 5 MHz, 10 MHz, 15 MHz and 20 MHz.

If at step 1108, the UE 107 determines that a spectrum segment in the current time interval 828 has a total or average energy greater than a threshold energy relative to a noise floor, then the spectrum segment may be identified in a second list of frequency spectrum segments for the current time interval 828 at step 1116. The spectrum segment may have an energy that exceeds a threshold when a proximately located high power UE transmits an uplink signal 804 in the spectrum segment, as shown in the example spectrum 902 and 904 of FIG. 9. The frequency spectrum segments identified in the first lists may be bounded by guard bands and the noise threshold may be determined based on the energy of one or more guard band frequencies added to a preconfigured offset value. In some embodiments, the noise floor is determined based on the energy of one or more guard band frequencies and the threshold energy is determined by offsetting the noise floor by a preconfigured offset value.

At step 1110, the UE 107 may determine whether another time interval 828 remains for processing and increments time interval counter at step 1118 accordingly.

After processing the spectrum segments in all of the time intervals 828, at step 1118, the UE 107 may determine a downlink frequency of a wireless communication system based on the frequency spectrum segments identified in the first and second lists. The UE 107 may determine a downlink frequency from the most frequently identified frequency spectrum segments in the first and second lists. The UE 107 may determine a downlink frequency by merging the first lists generated for a plurality of time intervals into a merged first list that is ordered by number of occurrences of spectrum segments, and merging the second lists generated for the set of time intervals into a merged second list that is ordered by number of occurrences of spectrum segments. The merged first list and the merged second list may be further ordered by spectrum segment energy.

The UE 107 may combine the merged first list with the merged second list to obtain a combined list limited to a predefined number of the most frequently occurring spectrum segments. The predetermined number may be selected to obtain a desired maximum absolute radio frequency channel number acquisition time. The UE 107 may search the spectrum segments identified in the combined list for the available uplink frequency and the available downlink frequency. The UE 107 may add spectrum segments to the combined list from the merged first list and the merged second list based on their frequency of occurrence and a list priority, the merged first list having a higher priority than the priority of the merged second list.

The UE 107 may determine the downlink frequency by identifying an absolute radio frequency channel number, such as an EAFRCN, corresponding to the available uplink and downlink frequencies. The UE 107 may determine a time division duplex uplink-downlink pattern.

Figure 12:
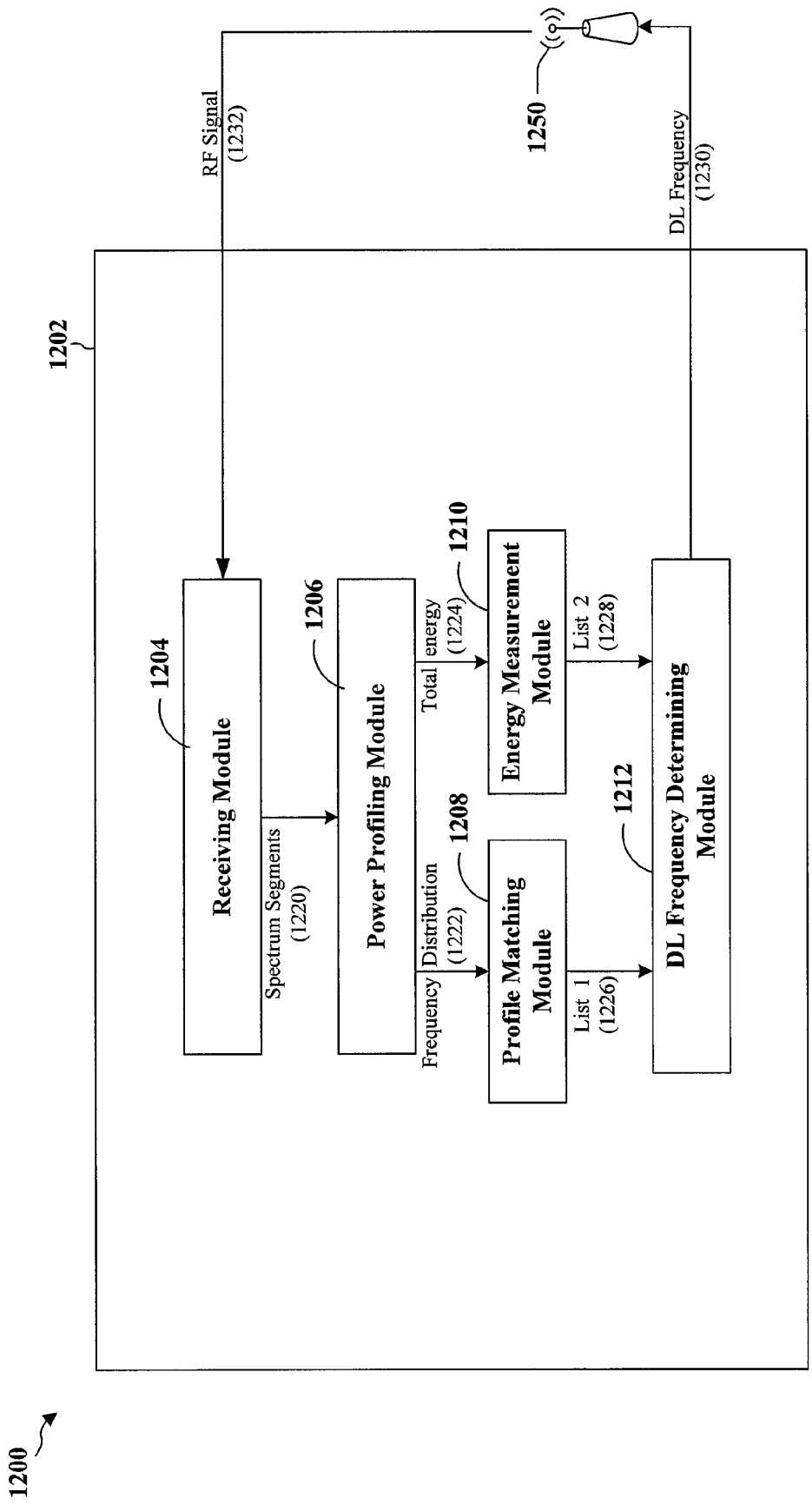
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus 1202 may be a UE 107. The apparatus 1202 includes a receiving module 1204 that receives an RF signal 1232 and provides spectrum segments 1220. The spectrum segments may be present in a plurality of time intervals 828. The duration of each time interval 828 may correspond to a downlink slot transmission time of the wireless communication system and the plurality of time intervals may comprise consecutive time intervals 828 and span half a frame transmission time of the wireless communication system. The plurality of time intervals may comprise 10 time intervals and each of the plurality of time intervals may have a duration of 0.5 milliseconds, totaling at least 5 milliseconds duration. In some embodiments, the plurality of time intervals repeats every 10 milliseconds.

A spectrum estimate of the received radio frequency signal in each of the plurality of time intervals 828 may be averaged with a spectrum estimate of the received radio frequency signal in a corresponding time interval in another plurality of time intervals. The spectrum estimates from corresponding time intervals may be averaged using a pipeline.

The apparatus 1202 includes a module 1206 that determines power profiles of frequency spectrum segments of a received radio frequency signal in a plurality of time intervals. The power profile of a frequency spectrum segment may be characterized by energy of the frequency spectrum segment and a distribution of the energy over the frequencies in the frequency spectrum segment (see, e.g. spectrum 900 of FIG. 9). The received radio frequency signal may include a downlink signal 802 transmitted by an access point (e.g. eNB 710) and an uplink signal 804 transmitted by user equipment 724. The number of time intervals 828 may be selected to provide at least one frequency spectrum segment comprising frequencies corresponding to the downlink signal 822, without frequencies from the uplink signal 824.

The apparatus 1202 includes a module 1208 that generates a first list 1226 of frequency spectrum segments for each time interval 828, the first list identifying frequency spectrum segments in the each time interval 828 that have an energy distribution matching a power profile of a downlink signal. In one example, a downlink signal may have a power or energy profile characterized as a flat or other shaped power segment 802 that may extend across a channel bandwidth, as shown in the spectrum 900 of FIG. 9. The frequency spectrum segments identified in the first lists may be bounded by guard bands. The wireless system may define a plurality of downlink channel bandwidths including one or more of 1.4 MHz, 3 MHz, 5 MHz, 10 MHz, 15 MHz and 20 MHz.

The apparatus 1202 includes a module 1210 that generates a second list 1228 of frequency spectrum segments for each time interval, the second list identifying frequency spectrum segments in the each time interval that have a total or average energy greater than a threshold energy relative to a noise floor. The spectrum segment may have an energy that exceeds a threshold when a proximately located high power UE transmits an uplink signal 804 in the spectrum segment, as shown in the example spectrum 902 and 904 of FIG. 9.

The apparatus 1202 includes a module 1210 that determines a downlink frequency 1230 of a wireless communication system based on the frequency spectrum segments identified in the first list 1226 and the second list 1228. The UE 107 may determine a downlink frequency from the most frequently identified frequency spectrum segments in the first and second lists. Module 1210 may determine a downlink frequency by merging the first lists generated for a plurality of time intervals into a merged first list that is ordered by number of occurrences of spectrum segments, and merging the second lists generated for the set of time intervals into a merged second list that is ordered by number of occurrences of spectrum segments. The merged first list and the merged second list may be further ordered by spectrum segment energy.

Module 1210 may combine the merged first list with the merged second list to obtain a combined list limited to a predefined number of the most frequently occurring spectrum segments. The predetermined number may be selected to obtain a desired maximum absolute radio frequency channel number acquisition time. Module 1210 may search the spectrum segments identified in the combined list for the available uplink frequency and the available downlink frequency. Module 1210 may add spectrum segments to the combined list from the merged first list and the merged second list based on their frequency of occurrence and a list priority, the merged first list having a higher priority than the priority of the merged second list.

Module 1210 may determine the downlink frequency by identifying an absolute radio frequency channel number, such as an EAFRCN, corresponding to the available uplink and downlink frequencies. Module 1210 may determine a time division duplex uplink-downlink pattern.

The apparatus may include additional modules that perform each of the steps of the algorithm in the aforementioned flow charts FIGS. 10 and 11. As such, each step in the aforementioned flow charts FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
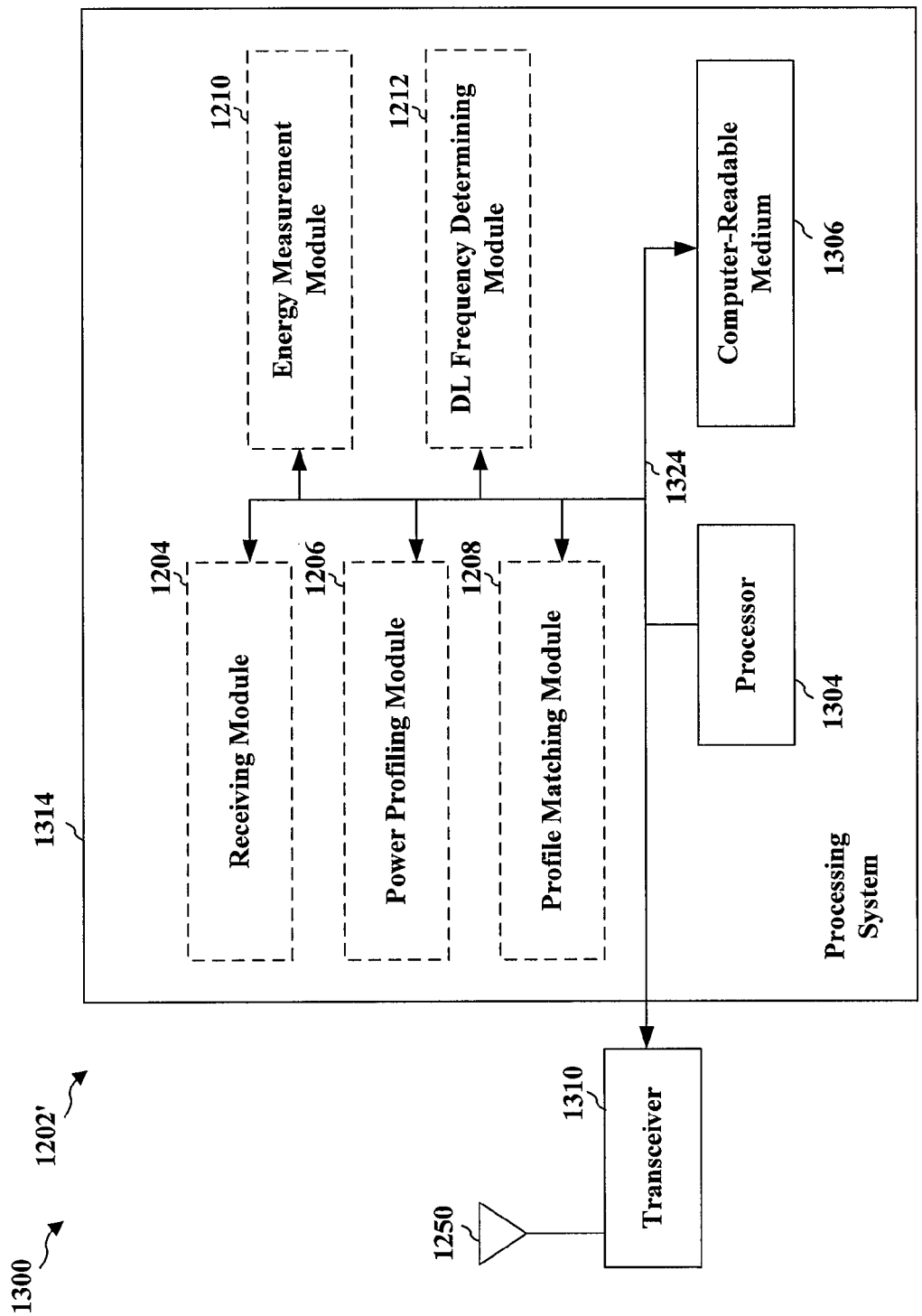
FIG. 13 is a diagram illustrating an example of a hardware implementation for an apparatus employing a processing system.

FIG. 13 is a diagram illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, and 1212. The modules 1204, 1206, 1208, 1210, and 1212 may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means 1204 for receiving a RF signal, means 1206 for determining power profiles of frequency spectrum segments of a received radio frequency signal in a plurality of time intervals, means 1208 for generating a first list of frequency spectrum segments for each time interval, the first list identifying frequency spectrum segments in the each time interval that have an energy distribution matching a power profile of a downlink signal, means 1210 for generating a second list of frequency spectrum segments for each time interval, the second list identifying frequency spectrum segments in the each time interval that have a total or average energy greater than a threshold energy relative to a noise floor, means 1210 generating a second list of frequency spectrum segments for each time interval, the second list identifying frequency spectrum segments in the each time interval that have a total or average energy greater than a threshold energy relative to a noise floor, and means 1212 for determining a downlink frequency of a wireless communication system based on the frequency spectrum segments identified in the first and second lists.

Means 1204 may provide spectrum segments 1220 that may be present in a plurality of time intervals 828. The duration of each time interval 828 may correspond to a downlink slot transmission time of the wireless communication system and the plurality of time intervals may comprise consecutive time intervals 828 and span half a frame transmission time of the wireless communication system. The plurality of time intervals may comprise 10 time intervals and each of the plurality of time intervals may have a duration of 0.5 milliseconds, totaling at least 5 milliseconds duration. In some embodiments, the plurality of time intervals repeats every 10 milliseconds.

A spectrum estimate of the received radio frequency signal in each of the plurality of time intervals 828 may be averaged with a spectrum estimate of the received radio frequency signal in a corresponding time interval in another plurality of time intervals. The spectrum estimates from corresponding time intervals may be averaged using a pipeline.

Means 1206 may determine power profiles characterized by energy of the frequency spectrum segment and a distribution of the energy over the frequencies in the frequency spectrum segment (see, e.g. spectrum 900 of FIG. 9). The received radio frequency signal may include a downlink signal 802 transmitted by an access point (e.g. eNB 710) and an uplink signal 804 transmitted by user equipment 724. The number of time intervals 828 may be selected to provide at least one frequency spectrum segment comprising frequencies corresponding to the downlink signal 822, without frequencies from the uplink signal 824.

In one example, means 1208 may determine a match when downlink signal has a power profile that is characterized by a flat or other shaped power segment 802 that may extend across a channel bandwidth, as shown in the spectrum 900 of FIG. 9. The frequency spectrum segments identified in the first lists may be bounded by guard bands. The wireless system may define a plurality of downlink channel bandwidths including one or more of 1.4 MHz, 3 MHz, 5 MHz, 10 MHz, 15 MHz and 20 MHz.

Means 1210 may identify frequency spectrum segments that have a total or average energy greater than a threshold energy when, for example, a proximately located high power UE transmits an uplink signal 804 in the spectrum segment, as shown in the example spectrum 902 and 904 of FIG. 9. The frequency spectrum segments identified in the first lists may be bounded by guard bands and the noise threshold may be determined based on the energy of one or more guard band frequencies added to a preconfigured offset value. In some embodiments, the noise floor is determined based on the energy of one or more guard band frequencies and the threshold energy is determined by offsetting the noise floor by a preconfigured offset value.

Means 1210 may determine a downlink frequency from the most frequently identified frequency spectrum segments in the first and second lists. Means 1210 may determine a downlink frequency by merging the first lists generated for a plurality of time intervals into a merged first list that is ordered by number of occurrences of spectrum segments, and merging the second lists generated for the set of time intervals into a merged second list that is ordered by number of occurrences of spectrum segments. The merged first list and the merged second list may be further ordered by spectrum segment energy.

Means 1210 may combine the merged first list with the merged second list to obtain a combined list limited to a predefined number of the most frequently occurring spectrum segments. The predetermined number may be selected to obtain a desired maximum absolute radio frequency channel number acquisition time. Means 1210 may search the spectrum segments identified in the combined list for the available uplink frequency and the available downlink frequency. Means 1210 may add spectrum segments to the combined list from the merged first list and the merged second list based on their frequency of occurrence and a list priority, the merged first list having a higher priority than the priority of the merged second list.

Means 1210 may determine the downlink frequency by identifying an absolute radio frequency channel number, such as an EAFRCN, corresponding to the available uplink and downlink frequencies. Means 1210 may determine a time division duplex uplink-downlink pattern.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
determining power profiles of frequency spectrum segments of a received radio frequency signal in a plurality of time intervals, wherein a power profile of a frequency spectrum segment is characterized by energy of the frequency spectrum segment and a distribution of the energy over frequencies in the frequency spectrum segment;
generating a first list of frequency spectrum segments for each time interval, the first list identifying frequency spectrum segments in the each time interval that have an energy distribution matching a power profile of a downlink signal; generating a second list of frequency spectrum segments for each time interval, the second list identifying frequency spectrum segments in the each time interval that have a total or average energy greater than a threshold energy; and
determining a downlink frequency of a wireless communication system based on the frequency spectrum segments identified in the first and second lists, wherein a spectrum estimate of the received radio frequency signal in each of the plurality of time intervals is averaged with a spectrum estimate of the received radio frequency signal in a corresponding time interval in another plurality of time intervals.

2. The method of claim 1, wherein determining the downlink frequency includes: merging the first lists generated for the plurality of time intervals into a merged first list that is ordered by number of occurrences of spectrum segments; and merging the second lists generated for the plurality of time intervals into a merged second list that is ordered by number of occurrences of spectrum segments.

3. The method of claim 2, wherein the merged first list and the merged second list are further ordered by spectrum segment energy.

4. The method of claim 2, wherein determining the downlink frequency includes:
combining the merged first list, with the merged second list to obtain a combined list limited to a predefined number of most frequently occurring spectrum segments; and
searching the spectrum segments identified in the combined list for an available uplink frequency and an available downlink frequency.

5. The method of claim 4, wherein the predefined number is selected to obtain a desired maximum absolute radio frequency channel number acquisition time.

6. The method of claim 4, wherein spectrum segments are added to the combined list from the merged first list and the merged second list based on their frequency of occurrence and a list priority, the merged first list having a higher priority than the merged second list.

7. The method of claim 1, wherein determining the downlink frequency includes identifying an absolute radio frequency channel number corresponding to the determined downlink frequency.

8. The method of claim 1, wherein the received radio frequency signal includes a downlink signal transmitted by an access point and an uplink signal transmitted by user equipment, and wherein a number of time intervals is selected to provide at least one frequency spectrum segment comprising the downlink signal, without the uplink signal.

9. The method of claim 1, wherein a duration of each time interval corresponds to a downlink slot transmission time of the wireless communication system.

10. The method of claim 9, wherein the plurality of time intervals comprises consecutive time intervals, and the plurality of time intervals spans half a frame transmission time of the wireless communication system.

11. The method of claim 9, wherein the plurality of time intervals comprises 10 time intervals and each of the plurality of time intervals has a duration of 0.5 milliseconds.

12. The method of claim 9, wherein the plurality of time intervals repeats every 10 milliseconds.

13. The method of claim 1, wherein spectrum estimates from corresponding time intervals are averaged using a pipeline.

14. The method of claim 1, wherein the frequency spectrum segments identified in the first lists are bounded by guard bands.

15. The method of claim 14, wherein the threshold energy is relative to a noise floor determined based on an energy of one or more guard band frequencies added to a preconfigured offset value.

16. The method of claim 14, wherein the threshold energy is relative to a noise floor determined based on an energy of one or more guard band frequencies and the threshold energy is determined by offsetting the noise floor by a preconfigured offset value.

17. The method of claim 14, wherein the threshold energy is determined based on a combination of a preconfigured offset and an energy level of one or more of lowest energy frequencies identified in the frequency spectrum segments.

18. The method of claim 1, wherein determining the downlink frequency includes determining a time division duplex uplink-downlink pattern.

19. The method of claim 18, wherein determining the power profiles of the frequency spectrum segments includes selecting a time division duplex band index number.

20. The method of claim 18, wherein determining the power profiles of the frequency spectrum segments includes setting a gain state for a low noise amplifier.

21. An apparatus for wireless communication, comprising:
means for determining power profiles of frequency spectrum segments of a received radio frequency signal in a plurality of time intervals, wherein a power profile of a frequency spectrum segment is characterized by energy of the frequency spectrum segment and a distribution of the energy over frequencies in the frequency spectrum segment;

means for generating a first list of frequency spectrum segments for each time interval, the first list identifying frequency spectrum segments in the each time interval that have an energy distribution matching a power profile of a downlink signal; means for generating a second list of frequency spectrum segments for each time interval, the second list identifying frequency spectrum segments in the each time interval that have a total or average energy greater than a threshold energy; and means for determining a downlink frequency of a wireless communication system based on the frequency spectrum segments identified in the first and second lists, wherein a spectrum estimate of the received radio frequency signal in each of the plurality of time intervals is averaged with a spectrum estimate of the received radio frequency signal in a corresponding time interval in another plurality of time intervals.

22. The apparatus of claim 21, wherein the means for determining the downlink frequency merges the first lists generated for the plurality of time intervals into a merged first list that is ordered by number of occurrences of spectrum segments, and merges the second lists generated for the plurality of time intervals into a merged second list that is ordered by number of occurrences of spectrum segments.

23. The apparatus of claim 22, the merged first list and the merged second list are further ordered by spectrum segment energy.

24. The apparatus of claim 22, wherein the means for determining the downlink frequency combines the merged first list, with the merged second list to obtain a combined list limited to a predefined number of most frequently occurring spectrum segments, and searches the spectrum segments identified in the combined list for an available uplink frequency and an available downlink frequency.

25. The apparatus of claim 24, wherein the predefined number is selected to obtain a desired maximum absolute radio frequency channel number acquisition time.

26. The apparatus of claim 24, wherein spectrum segments are added to the combined list from the merged first list and the merged second list based on their frequency of occurrence and a list priority, the merged first list having a higher priority than the merged second list.

27. The apparatus of claim 21, wherein the means for determining the downlink frequency identifies an absolute radio frequency channel number corresponding to the determined downlink frequency.

28. The apparatus of claim 21, wherein the received radio frequency signal includes a downlink signal transmitted by an access point and an uplink signal transmitted by user equipment, and wherein a number of time intervals is selected to provide at least one frequency spectrum segment comprising the downlink signal, without the uplink signal.

29. The apparatus of claim 21, wherein a duration of each time interval corresponds to a downlink slot transmission time of the wireless communication system.

30. The apparatus of claim 29, wherein the plurality of time intervals comprises consecutive time intervals, and the plurality of time intervals span half a frame transmission time of the wireless communication system.

31. The apparatus of claim 29, wherein the plurality of time intervals comprises 10 time intervals and each of the plurality of time intervals has a duration of 0.5 milliseconds.

32. The apparatus of claim 29, wherein the plurality of time intervals repeats every 10 milliseconds.

33. The apparatus of claim 31, wherein the means for determining the downlink frequency determines a time division duplex uplink-downlink pattern.

34. The apparatus of claim 21, wherein spectrum estimates from corresponding time intervals are averaged using a pipeline.

35. The apparatus of claim 21, wherein the frequency spectrum segments identified in the first lists are bounded by guard bands.

36. The apparatus of claim 35, wherein the threshold energy is relative to a noise floor determined based on an energy of one or more guard band frequencies added to a preconfigured offset value.

37. The apparatus of claim 35, wherein the threshold energy is relative to a noise floor determined based on an energy of one or more guard band frequencies and the threshold energy is determined by offsetting the noise floor by a preconfigured offset value.

38. The apparatus of claim 35, wherein the threshold energy is determined based on a combination of a preconfigured offset and an energy level of one or more of lowest energy frequencies identified in the frequency spectrum segments.

39. The apparatus of claim 21, wherein the means for determining the power profiles of the frequency spectrum segments selects a time division duplex band index number.

40. The apparatus of claim 21, wherein the means for determining the power profiles of the frequency spectrum segments sets a gain state for a low noise amplifier.

41. An apparatus for wireless communication, comprising:
at least one processor;
and a memory coupled to the at least one processor, wherein the at least one processor is configured:
to determine power profiles of frequency spectrum segments of a received radio frequency signal in a plurality of time intervals, wherein a power profile of a frequency spectrum segment is characterized by energy of the frequency spectrum segment and a distribution of the energy over frequencies in the frequency spectrum segment; to
generate a first list of frequency spectrum segments for each time interval, the first list identifying frequency spectrum segments in the each time interval that have an energy distribution matching a power profile of a downlink signal; to generate a second list of frequency spectrum segments for each time interval, the second list identifying frequency spectrum segments in the each time interval that have a total or average energy greater than a threshold energy; and to
determine a downlink frequency of a wireless communication system based on the frequency spectrum segments identified in the first and second lists, wherein a spectrum estimate of the received radio frequency signal in each of the plurality of time intervals is averaged with a spectrum estimate of the received radio frequency signal in a corresponding time interval in another plurality of time intervals.

42. A non-transitory computer-readable medium having program code recorded thereon, the program code including:
program code to cause a computer to determine power profiles of frequency spectrum segments of a received radio frequency signal in a plurality of time intervals, wherein a power profile of a frequency spectrum segment is characterized by energy of the frequency spectrum segment and a distribution of the energy over frequencies in the frequency spectrum segment;

program code to cause a computer to generate a first list of frequency spectrum segments for each time interval, the first list identifying frequency spectrum segments in the each time interval that have an energy distribution matching a power profile of a downlink signal;

program code to cause a computer to generate a second list of frequency spectrum segments for each time interval, the second list identifying frequency spectrum segments in the each time interval that have a total or average energy greater than a threshold energy; and program code to cause a computer to determine a downlink frequency of a wireless communication system based on the frequency spectrum segments identified in the first and second lists, wherein a spectrum estimate of the received radio frequency signal in each of the plurality of time intervals is averaged with a spectrum estimate of the received radio frequency signal in a corresponding time interval in another plurality of time intervals.

* * * * *